(12) United States Patent
Gay

(10) Patent No.: US 10,935,745 B1
(45) Date of Patent: Mar. 2, 2021

(54) MULTI-CARRIER FIBER DISTRIBUTION HUB

(71) Applicant: Forrest Tyrone Gay, Clermont, FL (US)

(72) Inventor: Forrest Tyrone Gay, Clermont, FL (US)

( * ) Notice: Subject to any disclaimer, the term of this patent is extended or adjusted under 35 U.S.C. 154(b) by 0 days.

(21) Appl. No.: 16/041,496

(22) Filed: Jul. 20, 2018

Related U.S. Application Data

(60) Provisional application No. 62/534,795, filed on Jul. 20, 2017.

(51) Int. Cl.
| | |
|---|---|
| *G02B 6/46* | (2006.01) |
| *G02B 6/00* | (2006.01) |
| *G02B 6/44* | (2006.01) |
| *H04Q 1/14* | (2006.01) |

(52) U.S. Cl.
CPC ......... *G02B 6/4452* (2013.01); *G02B 6/4446* (2013.01); *H04Q 1/14* (2013.01)

(58) Field of Classification Search
CPC .................................................. G02B 6/4452
See application file for complete search history.

(56) References Cited

U.S. PATENT DOCUMENTS

| | | | |
|---|---|---|---|
| 6,195,364 B1 | 2/2001 | Brodigan | |
| 6,714,545 B1 | 3/2004 | Hugenberg et al. | |
| 7,099,443 B2 | 8/2006 | Phillips et al. | |
| 7,190,874 B1 | 3/2007 | Barth et al. | |
| 7,260,301 B2 | 8/2007 | Barth et al. | |
| 7,486,860 B2 | 2/2009 | Bell et al. | |
| 7,496,269 B1 * | 2/2009 | Lee ...................... | G02B 6/4452 385/134 |
| 7,751,672 B2 | 7/2010 | Smith et al. | |
| 7,822,312 B2 | 10/2010 | Gniadek et al. | |
| 8,229,265 B2 | 7/2012 | Solheid et al. | |
| 8,374,476 B2 | 2/2013 | Reagan et al. | |
| 8,498,511 B2 | 7/2013 | Reagan et al. | |
| 8,569,618 B2 * | 10/2013 | Landry ................ | G02B 6/4452 174/50 |
| 8,649,649 B2 | 2/2014 | Smith et al. | |
| 8,837,940 B2 | 9/2014 | Smith et al. | |
| 8,879,882 B2 | 11/2014 | Conner et al. | |
| 8,886,003 B2 | 11/2014 | Nieves et al. | |
| 9,354,415 B2 | 5/2016 | Nair et al. | |
| 9,411,118 B2 | 8/2016 | Matz et al. | |
| 2006/0165413 A1 | 7/2006 | Schemmann et al. | |
| 2008/0080825 A1 * | 4/2008 | Leon .................... | G02B 6/4452 385/135 |
| 2009/0238530 A1 | 9/2009 | Wakileh et al. | |

(Continued)

*Primary Examiner* — Eric Wong
(74) *Attorney, Agent, or Firm* — Glenn E. Gold, P.A.; Glenn E. Gold

(57) ABSTRACT

A fiber distribution hub includes a set of carrier-specific and modular service provider housings in a scalable, stacked arrangement. Each service provider housing is associated with a dedicated carrier. The multiple service provider housing modules are individually selectively-integrated with one another to create a vertically-stacked distribution housing of the hub. The distribution housing functions as a common network resource shared by all of the service provider housings. In this shared distribution configuration, all of the service provider housings have access to the same distribution network servicing a subscriber population.

14 Claims, 8 Drawing Sheets

(56) References Cited

U.S. PATENT DOCUMENTS

| | | | |
|---|---|---|---|
| 2012/0093474 A1* | 4/2012 | Cox | G02B 6/4452 |
| | | | 385/135 |
| 2013/0034335 A1* | 2/2013 | Landry | G02B 6/4471 |
| | | | 385/135 |
| 2016/0202424 A1* | 7/2016 | Kewitsch | B25J 18/025 |
| | | | 385/17 |
| 2018/0224618 A1* | 8/2018 | Burkett | H04Q 1/025 |

* cited by examiner

MULTI-CARRIER FIBER DISTRIBUTION HUB

CROSS-REFERENCE TO RELATED APPLICATIONS

This U.S. non-provisional patent application claims the benefit of U.S. provisional patent application No. 62/534,795, filed Jul. 20, 2017, which is incorporated-by-reference herein in its entirety.

FIELD OF THE INVENTION

The present invention relates generally to fiber distribution hubs, and, more particularly, is concerned with a fiber distribution hub that supports the deployment of a plurality of carrier-specific and modular service provider housings in a stacked and scalable arrangement, wherein each service provider housing is incorporated as an independent module of a shared distribution housing.

BACKGROUND OF THE INVENTION

A fiber distribution hub is an enclosure that provides the connection between fiber optic cables and passive optical splitters in the outside plant segment of the network. In conventional configurations, the hub services a single carrier. This makes it difficult and expensive for carriers to expand to new service areas, since doing so requires building another hub and distribution network. This drawback serves as a limitation to the range of services that subscribers can access. If carriers face obstacles to expansion, then subscribers will experience the effect of having a limited consumer choice when it comes to selecting services.

Accordingly, there is a long-felt but, as-of-yet, unmet need for a fiber distribution hub that overcomes the deficiencies of conventional single-carrier hub arrangements.

BRIEF SUMMARY OF THE INVENTION

The present invention is directed to a modular and scalable fiber optic distribution hub. The hub includes a plurality of carrier-specific service provider housing modules configured in a stacked, scalable arrangement. The hub further includes a single distribution housing, which is commonly shared as an accessible resource by each of the service provider housing modules in the stacked arrangement. The scalable feature allows the hub to be expanded to include additional service provider housing modules, which is readily done since the individual service provider housings are provided in modular form.

In one aspect of the present invention, a fiber distribution hub comprises:

a distribution housing having a fiber optic distribution bulkhead;

a plurality of service provider housing modules each having a respective fiber optic feeder bulkhead and having a connection to the distribution housing; and a scalable stacked arrangement including the plurality of service provider housing modules.

These and other aspects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, in which.

Like reference numerals refer to like parts throughout the several views of the drawings.

DETAILED DESCRIPTION OF PREFERRED IMPLEMENTATIONS

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
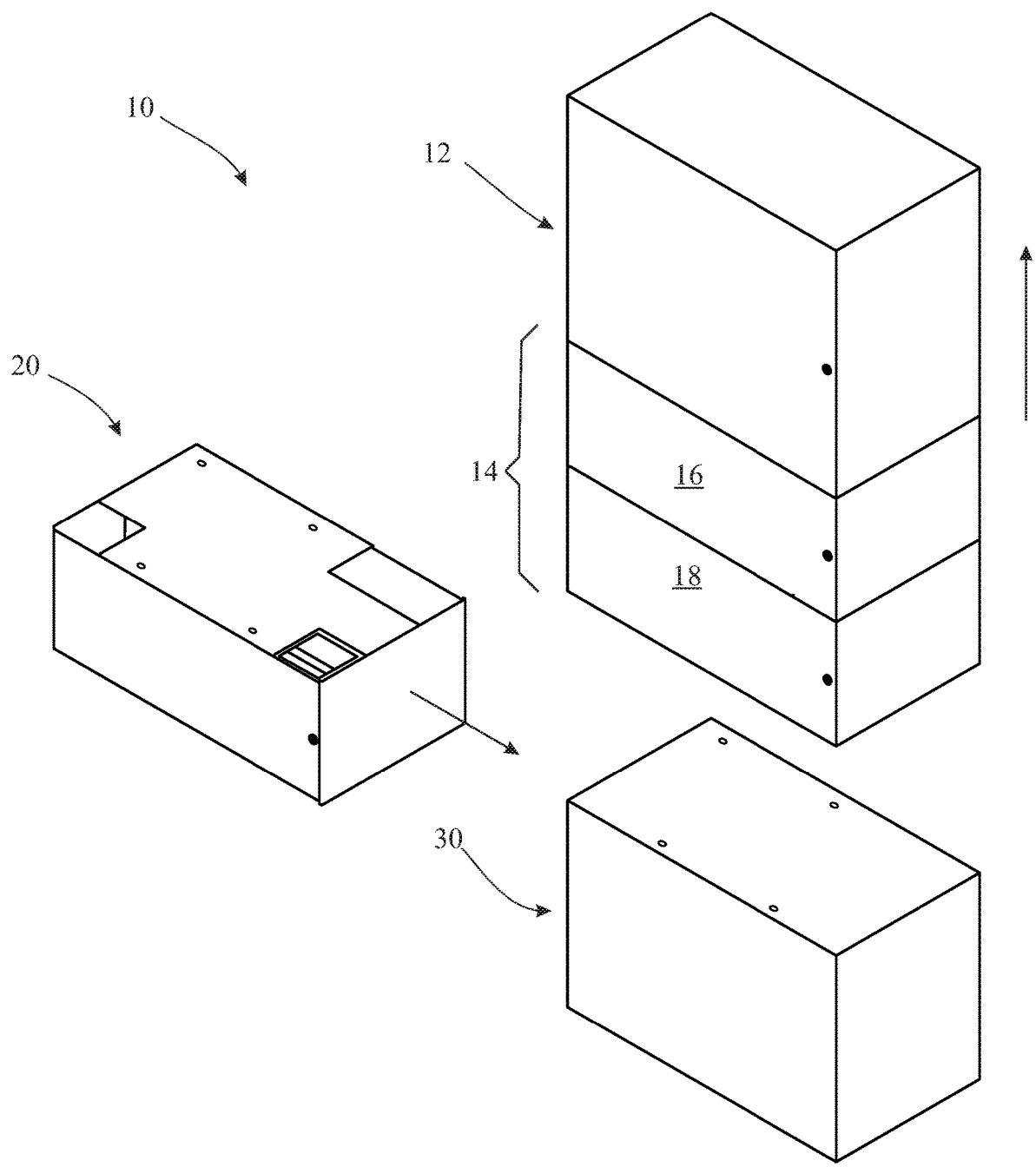
FIG. 1 presents a partially-exploded upper isometric view of a fiber optic distribution hub, according to aspects of the present invention, illustration the modular capabilities of the distribution hub.

Referring now generally to accompanying FIGS. 1-12, a multi-carrier fiber optic distribution hub is illustrated generally at 10, according to aspects of the present invention. Referring particularly to FIG. 1, the hub 10 includes a distribution housing, or module, shown generally at 12, and a stackable set of modular service provider housings or modules, shown generally at 14, including an exemplary first service provider housing or module 16 and an exemplary second servicer provider housing/module 18. The hub 10 may include a riser, generally illustrated at 30, that serves as the elevated platform, or pedestal, upon which the arrangement of distribution housing 12 and the set of modular service provider housings 14 are stacked. As shown, in a preferred form, the distribution housing 12 occupies a top position in the stacked arrangement, while the set of service provider housings 14 occupy an intermediate position between the riser 30 and distribution housing 12. Generally, the hub 10 is an enclosure that provides the connection between fiber optic cables and passive optical splitters in the outside plant segment of the access network. The hub facilitates, or makes it quick and easy, to service connections and reconfigurations, and serves as an administrative and testing point in the outside plant network.

As discussed further, each stacked service provider housing 16, 18 is an independent unit functionally distinct from the other service provider housing modules, and is independently connected to the distribution housing 12. According to aspects of the present invention, the modular feature of hub 10 permits additional service provider housings, shown generally and in exemplary form as service provider housing 20, to be added to the stacked set of service provider housings and connected to distribution housing 12. Any quantity of service provider housing modules 20 can be stacked in hub 10. In this manner, hub 10 can be considered to exhibit a scalable architecture, since hub 10 can be expanded to include additional carrier-specific service provider housings by merely installing the appropriate number of modular-style service provider housings 20, and connecting them to distribution housing 12, which is a common, shared resource or network asset. The entire configuration of distribution hub 10 is typically housed in a cabinet or other suitable enclosure found in the field, for example, at a plant location that is part of an access network providing FTTx (fiber-to-the-x) services, such as FTTH (fiber to the home), FTTC (fiber to the curb), FTTB (fiber to the building), and FTTN (fiber to the node).

Each one of the service provider housings in the stacked set 14 is associated with a dedicated service provider or carrier. Hub 10 thus makes available services from an array of carriers or service providers that are able to access in common distribution housing 12. This multi-carrier capability of hub 10, combined with the common use of distribution housing 12 by the set of service provider housings 14, provides a significant benefit; to wit, at the subscriber end, the access network is able to offer the subscriber a host of services from the entire portfolio of providers represented by the set of service provider housings 14. Moreover, additional services can be made available by simply installing an additional service provider housing 20 in hub 10, and connecting it to the network via distribution housing 12. A notable feature of hub 10 is that distribution housing 12 is a common, shared resource available for connection to any and all of the service provider housings 16 in the stacked arrangement 14. In this manner, each carrier (represented by its own assigned service provider housing in hub 10) is able to access the same distribution network available to all of the other carriers utilizing hub 10.

Figure 2:
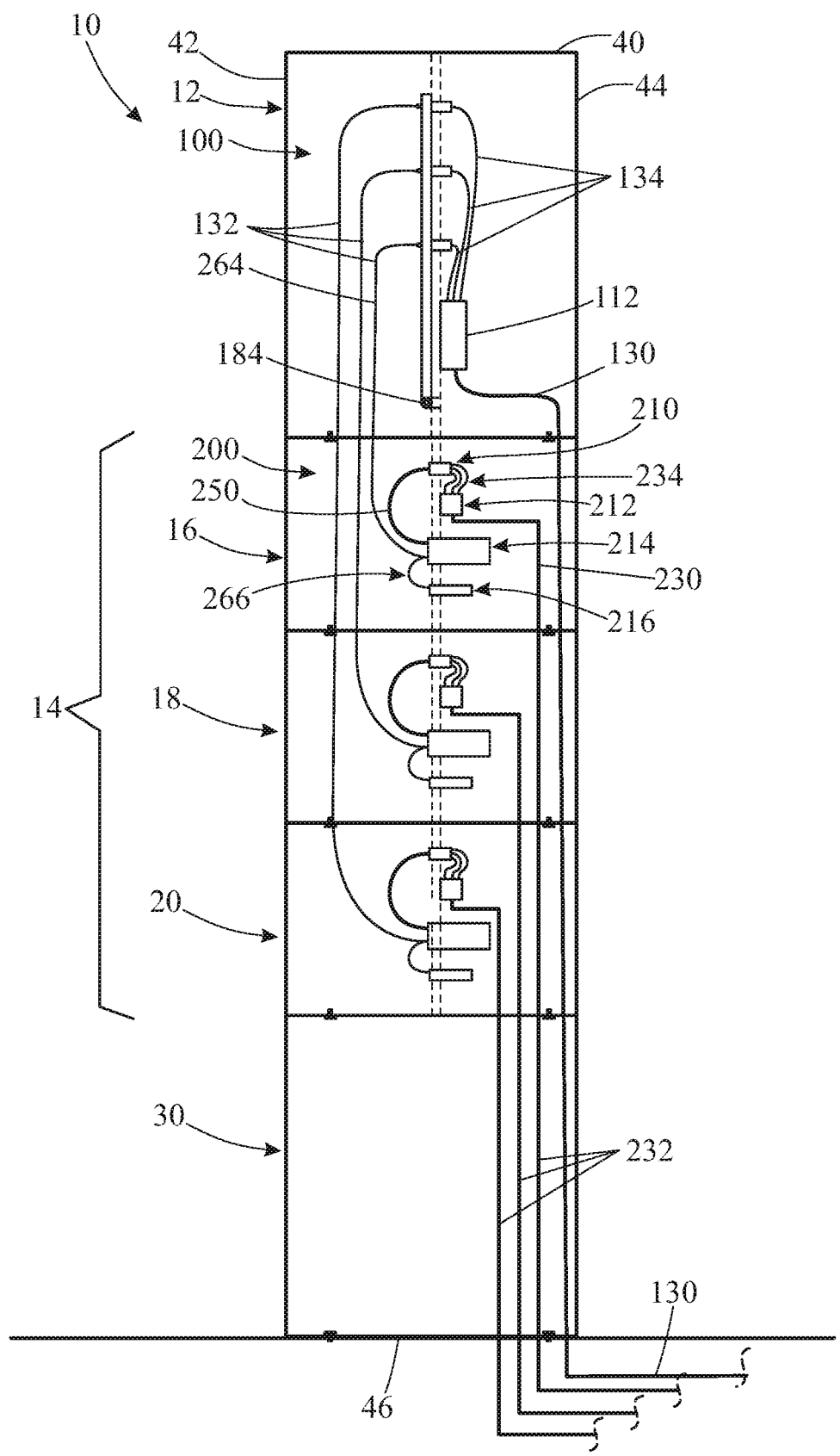
FIG. 2 presents a lateral, planar schematic view of the interior of the fiber optic distribution hub originally introduced in FIG. 1, illustrating the configuration and interconnection among the distribution housing and the modular array of service provider housings.

Referring now to FIG. 2, the hub 10 defines an enclosure including a top side 40, a front side 42, a rear side 44, and a bottom side 46. As shown, the distribution housing 12 defines a compartment space for housing the distribution components, shown generally at 100. Additionally, as shown, the illustrative service provider housing 16 defines a compartment space for housing the service provider components, shown generally at 200. The other service provider housings 18, 20 have a similar configuration to service provider housing 16.

Figure 12:
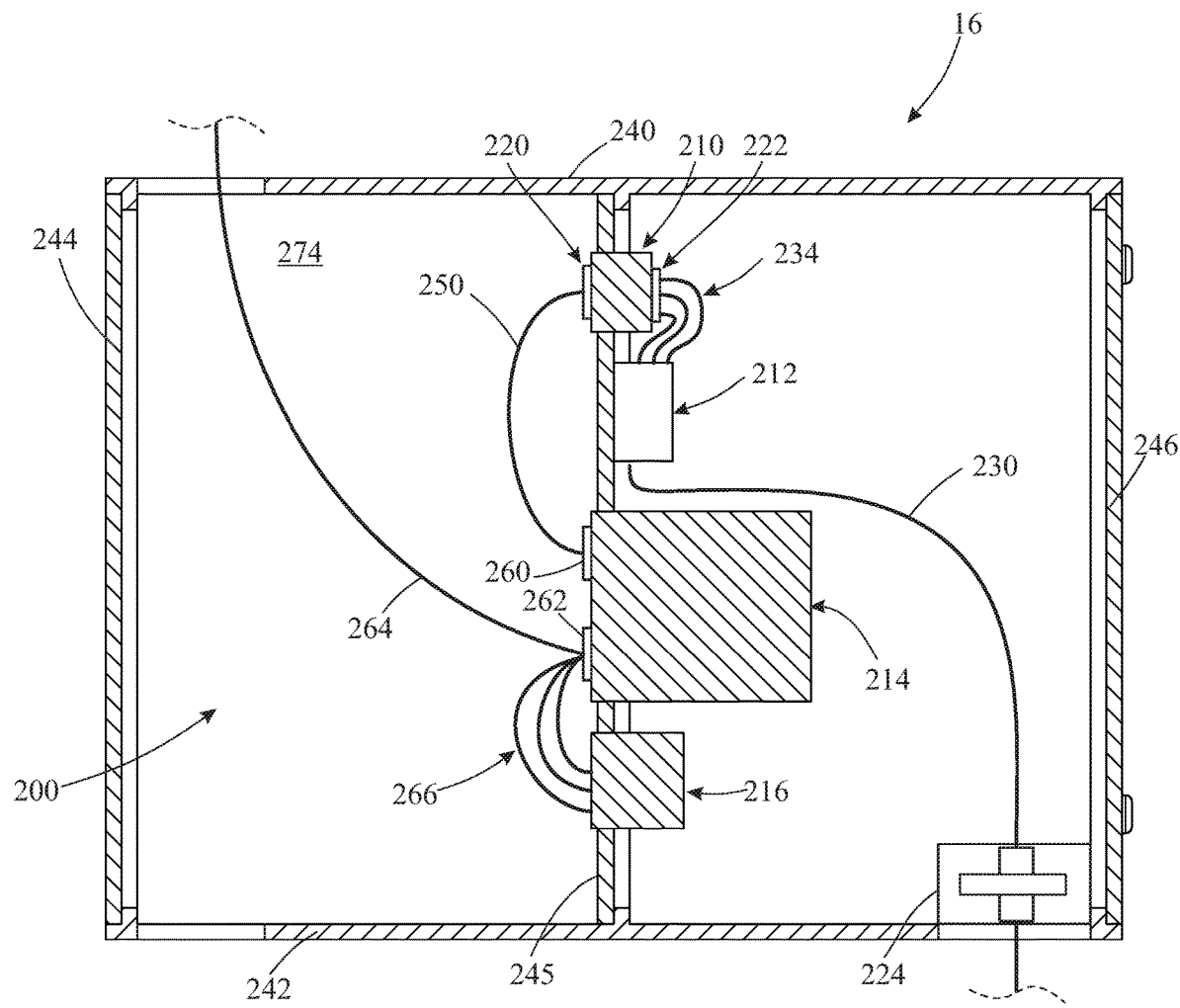
FIG. 12 presents a lateral, planar, sectional schematic view of the interior of the service provider housing originally introduced in FIG. 1, and further depicted in FIGS. 8-11, as taken along section lines 12-12 of FIG. 8, illustrating the configuration and interconnection among the components of the service provider housing.

Referring now to FIGS. 8-12, with continuing reference to FIG. 2 and particular emphasis on FIG. 12, the networked circuit or system of components 200 of illustrative service provider housing 16 includes, in combination, a feeder bulkhead 210, a fan kit 212, a splitter storage module 214, and a bus hold 216. In one form, these components are conventional items that can be installed as a black box, plug-and-play facility simply requiring the appropriate cabling connections. The feeder bulkhead 210 includes a front plane, generally illustrated at 220, and a backplane, generally illustrated at 222. At an input side, a fiber optic feeder cable 230 enters service provider housing 16 and is connected to fan kit 212. The feeder cable 230 originates from an optical line terminal (OLT) typically located at the central office (CO) or head end (HE) of a service provider or carrier. The feeder cable 230 is one of a set of feeder cables 232 (FIG. 2) that enter the plant environment of hub 10. Each illustrative one 230 of the set of feeder cables 232 originates from a dedicated carrier facility and is routed in the hub 10 to the appropriate one of the service provider housings 16, 18, 20 associated with the designated carrier. The buffer tube or feeder cable 230 is routed into the interior compartment space of service provider housing 16 via a conventional cable attachment plate 224.

The service provider housing 16 has a box-like configuration including a top side 240, a bottom side 242, a front side 244, and a back side 246. A partition, wall, or other suitable barrier 245 divides the interior space into a front compartment 247 defining a front plane area, and a rear compartment 248 defining a backplane area.

The fan kit 212, in a conventional manner, serves as a fan out or breakout facility that branches out the set of individual fiber optic strands, generally illustrated at 234, which are contained in the buffer tube of feeder cable 230. The fiber optic strands are terminated at the backplane 222 of the feeder bulkhead 210. In one exemplary form, the feeder cable 230 supports twenty-four (24) fiber optic strands 234. The feeder bulkhead 210 has a conventional arrangement and serves, in one form, as a coupler to create interconnection points. At the front plane 220 of feeder bulkhead 210, an illustrative input fiber line 250 is routed and connected to an input end 260 of splitter storage 214.

The splitter storage 214 contains an array of individual optical splitters, for example, a capacity of fifteen (15) optical splitter devices. The set of optical splitters stored in splitter storage 214 provides a conventional optical splitting functionality. In a conventional fashion, splitter storage 214 supplies at an output end 262, for example, a plurality of terminated single mode fibers, generally illustrated at 264, which are cross-connected to the front plane of the distribution housing 12. In one exemplary form, the splitter storage 214 has a 1×32 capability, supplying thirty-two (32) single mode fibers 264. The fiber optic cable or jumper 264 is routed from an output side (front plane 220) of service provider housing 16 to the front plane of distribution housing 12. The bus hold 216 has a conventional form and is used to park any fiber lines not in use, generally illustrated at 266. In one exemplary arrangement of service provider component arrangement 200, feeder bulkhead 210 has a twenty-four (24) line capability, splitter storage 214 includes a set of 1×32 optical splitters (max capacity of fifteen), and bus hold 216 has 2-32 distribution connectors.

Reference is now made to FIGS. 8-11, with continuing reference to FIGS. 2 and 12, to describe the physical layout of the box-type enclosure, case or compartment that houses the components 200 of service provider housing 16. As shown, the enclosure of service provider housing 16 includes a top side 240, a bottom side 242, a front side 244 in the form of a swivel door or panel (in an open position in FIG. 10), a rear side 246 in the form of a removable panel or plate (FIG. 9), and a pair of lateral sides 243 (only one shown). The enclosure includes a pair of upper openings 270 formed at the front corners at the top side 240 of the enclosure and a pair of lower openings 272 formed at the front corners at the bottom side 242 of the enclosure. The pair of upper openings 270 and pair of lower openings 272 are aligned with one another.

The upper openings 270 and lower openings 272 provide a means by which cabling from the front plane 247 of service provider housing 16 (namely, fiber lines 264 from optical splitter storage 214) can be routed, fed, or otherwise threaded through adjacent, overlying service provider housings in the stacked arrangement 14, in order to reach the front plane of distributor housing 12. In the stacked arrangement 14 of service provider housings, an upper opening 270 of one service provider housing will be proximally aligned with a lower opening 272 of another, immediately adjacent service provider housing that is stacked on it. In this manner, the fiber lines 264 from any lower service provider housing in the stacked arrangement 14 (i.e., service provider housings 18, 20 in FIG. 1) can be navigated to the distributor housing 12 by threading fiber lines 264 through any intervening and overlying service provider housings, using the upper openings 270 and lower openings 272 of the upper, intervening service provider housings as the navigation route. The set of openings 270, 272 of each individual one of the stacked service provider housings are vertically aligned with one another.

The enclosure for the service provider housing 16 further includes an upper opening 274 formed at one of the rear corners at the top side 240 of the enclosure, and a lower opening 276 aligned with upper opening 274 and formed at one of the rear corners at the bottom side 242 of the enclosure. The pair of rear openings 274, 276 provides a means by which cabling can enter and access the backplane 248 of service provider housing 16, namely, feeder cable 230 routing to fan kit 212. Due to the stacked arrangement 14 of service provider housings, the pair of rear openings 274, 276 of each individual one of the stacked service provider housings are vertically aligned with one another. This alignment relationship enables a carrier-specific feeder cable 230 to be threaded through any intervening service provider housings until it reaches the appropriate one that is associated with the designated carrier. The threading takes place in the backplane area 248. In conventional fashion, the feeder cables 230 enter the plant environment from a ground or buried location proximal the underside of riser 30, requiring the assortment of carrier-specific feeder cables 232 (FIG. 2) from the multiple carriers to be routed vertically until reaching the appropriate destination (e.g., designated service provider housing 16 in the stacked arrangement 14 for feeder cable 230).

Figure 10:
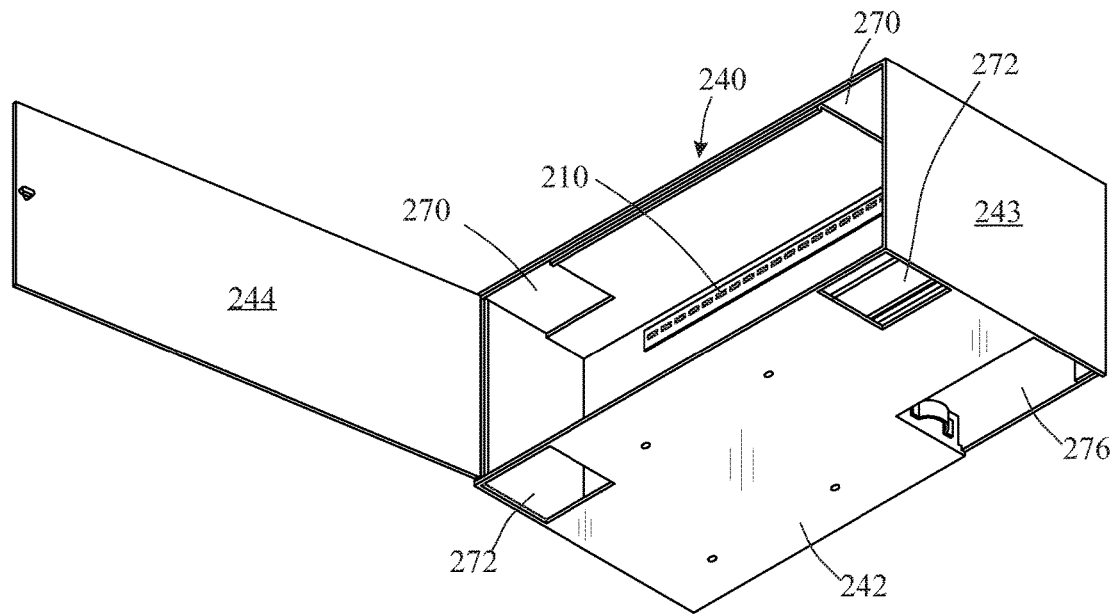
FIG. 10 presents an upper elevation, front isometric view of the service provider housing depicted in FIGS. 8-9, illustrating the front backplane of the feeder bulkhead accessed by a lowering of the front service panel.
Figure 11:
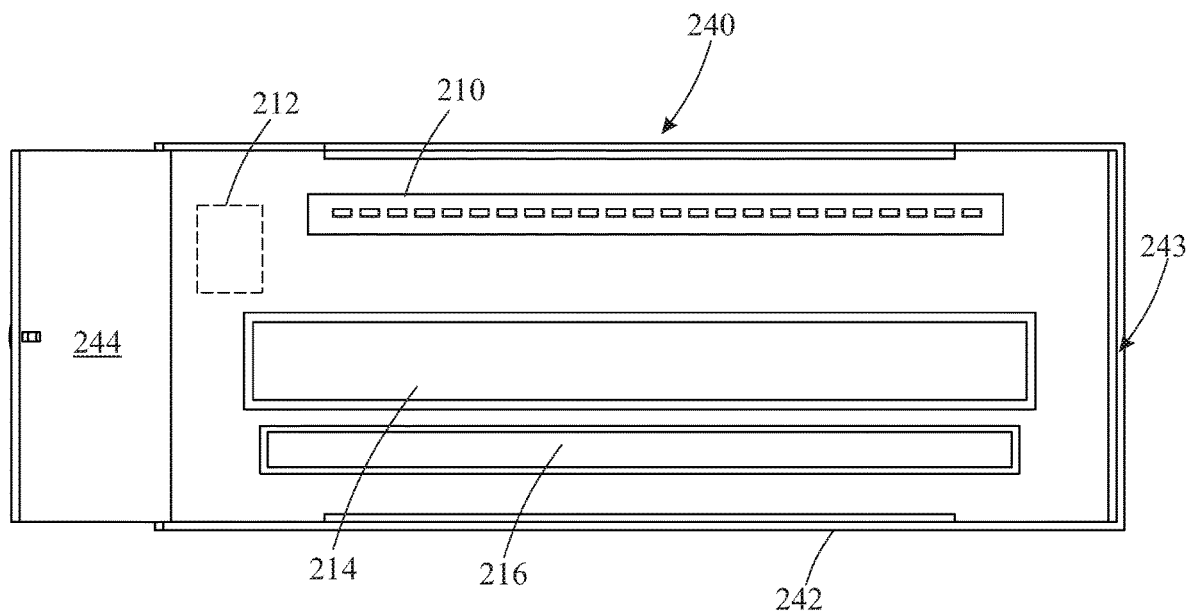
FIG. 11 presents a front planar view of the service provider housing variously shown in FIGS. 8-10, illustrating the various components of the service provider housing.

The enclosure is designed to facilitate access by a service technician or other personnel to the front plane 247 and backplane 248 of exemplary service provider housing 16. In particular, referring to FIG. 9, the backplane 248 is accessible by removing the back plate 246 (e.g., removing attachment screws at the corners). Referring to FIG. 10, the front plane 247 is accessible by opening the swivel door or panel 244, notably enabling access to the front plane 220 of the feeder bulkhead 210.

Figure 4:
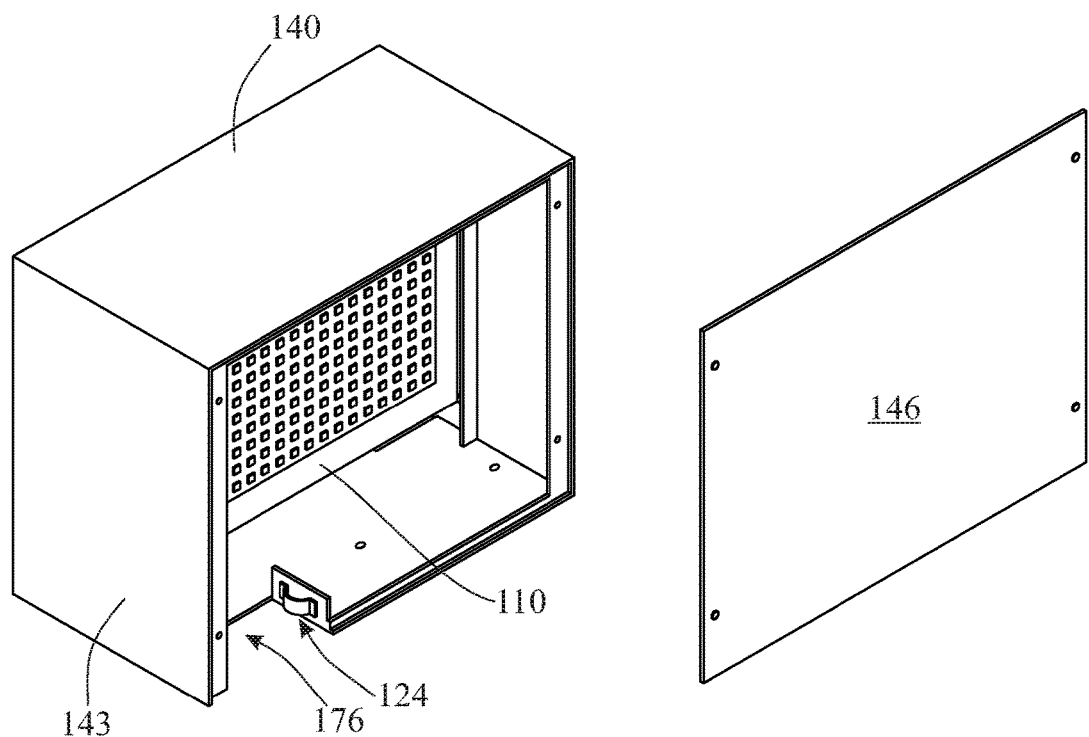
FIG. 4 presents an upper elevation, rear isometric view of the distribution housing for the fiber optic distribution hub originally introduced in FIG. 1, illustrating the backplane of the distribution bulkhead accessed by removal of the rear service panel.
Figure 5:
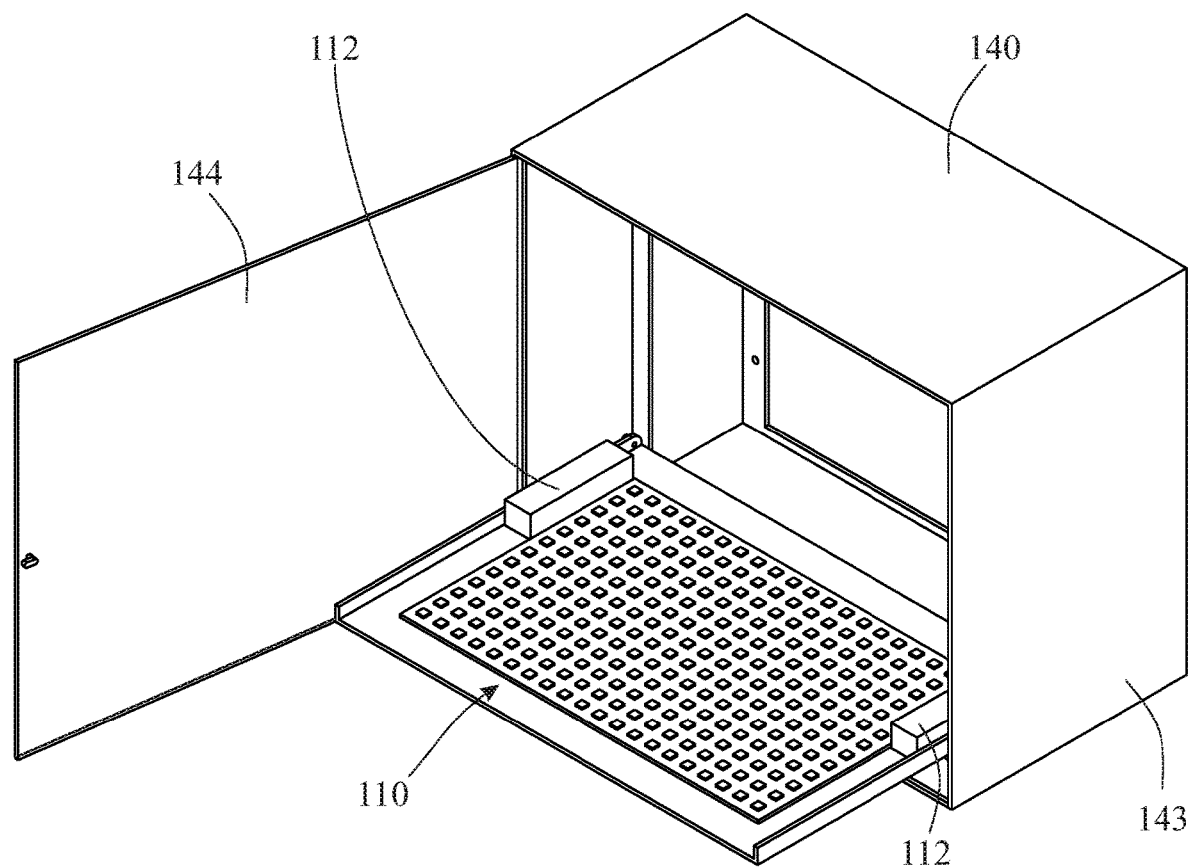
FIG. 5 presents an upper elevation, front isometric view of the distribution housing for the fiber optic distribution hub originally introduced in FIG. 1, and further depicted in FIG. 3, illustrating the distribution bulkhead in a pivoted condition to enable access to the backplane from a front position.
Figure 6:
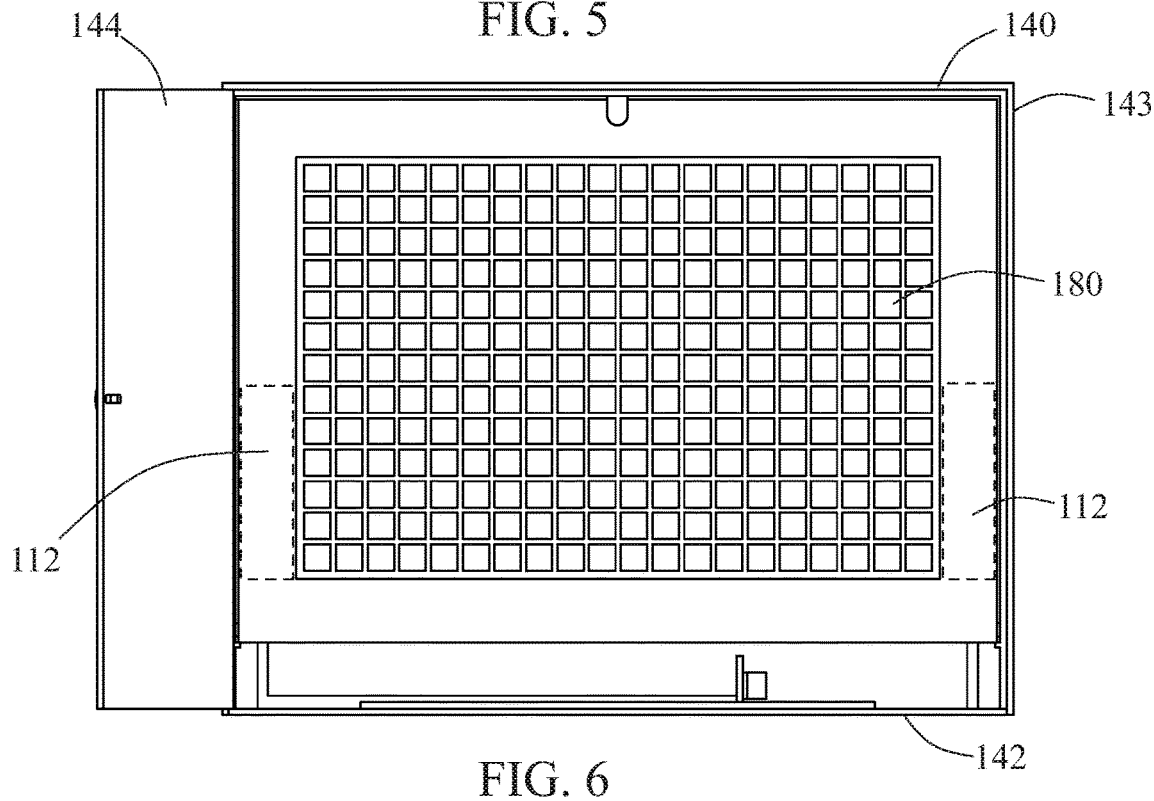
FIG. 6 presents a front planar view of the interior of the distribution housing variously shown in FIGS. 3-5, illustrating the distribution jumper connectors at the front plane of the distribution bulkhead.
Figure 7:
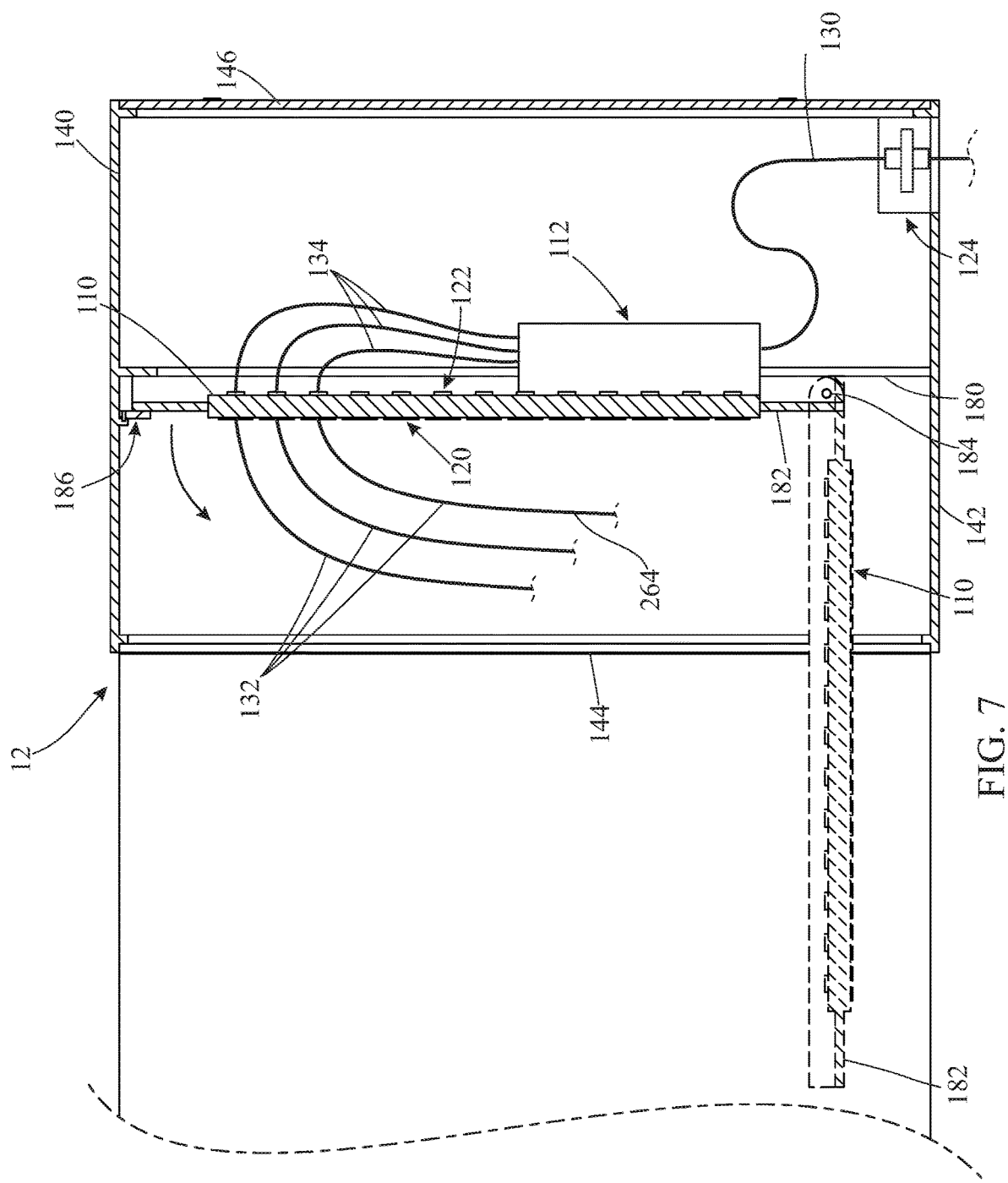
FIG. 7 presents a lateral, planar sectional schematic view of the interior of the distribution housing originally introduced in FIG. 2, taken along section lines 7-7 in FIG. 3, illustrating the components and connections of the distribution bulkhead and the pivoting capability of the distribution bulkhead.
Figure 8:
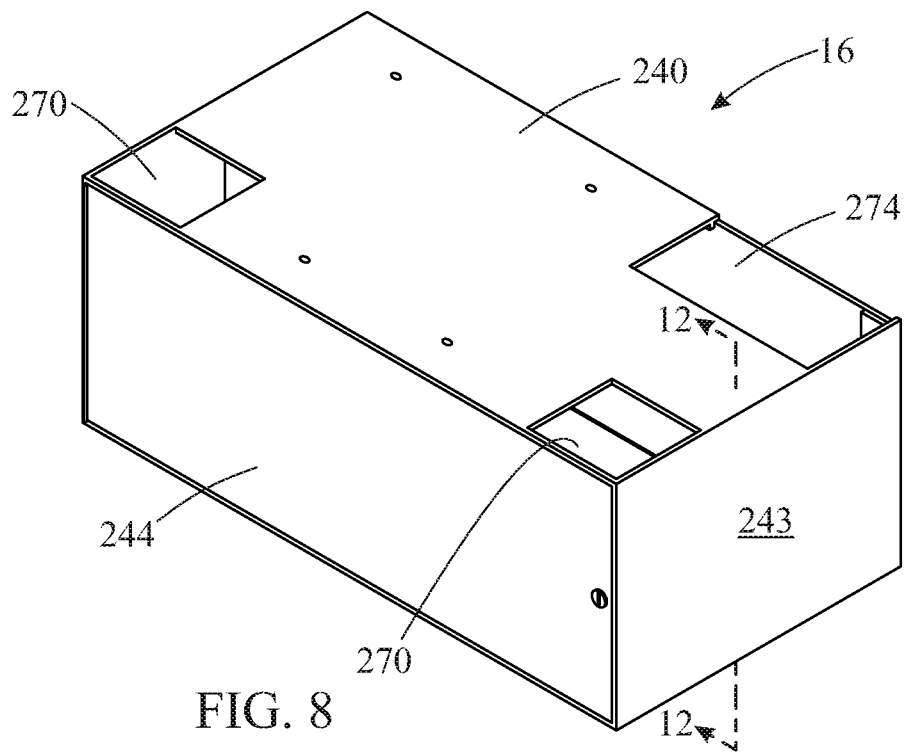
FIG. 8 presents an upper elevation, top isometric view of an exemplary service provider housing of the fiber distribution hub originally introduced in FIG. 1.
Figure 9:
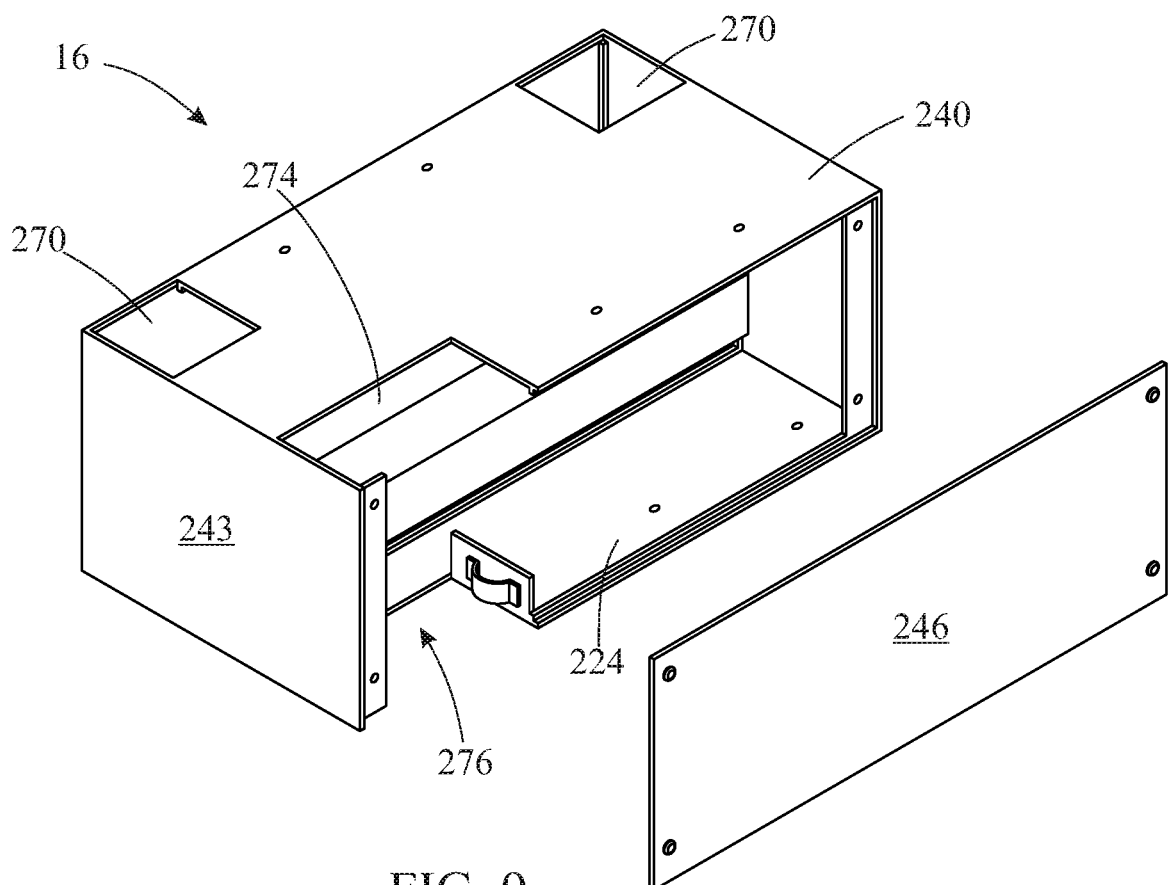
FIG. 9 presents an upper elevation, rear isometric view of the service provider housing shown in FIG. 8, illustrating the rear backplane of the feeder bulkhead accessed by removal of the rear service panel.

Referring now to FIGS. 3-7, with continuing reference to FIG. 2 and particular emphasis on FIG. 7, the networked circuit or system of components 100 of illustrative distribution housing 12 includes, in combination, a distribution bulkhead 110 and a fan kit 112. In one form, these components are conventional items that can be installed as a black box, plug-and-play facility simply requiring the appropriate cabling connections. The distribution bulkhead 110 includes a front plane, generally illustrated at 120, and a backplane, generally illustrated at 122. At an input side (front plane 120), a set of fiber optic lines 132 from the stacked arrangement 14 of service provider housings is connected to the front plane 120 of distribution bulkhead 110. For example, fiber optic line 264 originates from service provider housing 16 (FIGS. 2 and 12), i.e., fiber optic line 264 is a jumper cable from service provider housing 16 to distribution bulkhead 110. Each individual one of the set of fiber optic lines 132 is associated with a respective carrier or service provider, i.e., each one of the fiber optic lines 132 is associated with a respective one of the service provider housings in the stacked arrangement 14. FIG. 6 shows an illustrative distribution jumper functioning as an adapter, coupler, or other suitable connector at the front plane 120 of distribution bulkhead 110 where the individual fiber optic lines or jumpers 132 terminate.

At an output side (backplane 122) of distribution bulkhead 110, a set of optical fiber lines 134 are connected from the backplane 122 of distribution bulkhead 110 to fan out kit 112, which groups the set of fiber lines 134 in a conventional manner into buffered fiber optic output cable 130 (i.e., a buffer tube). Any suitable number of fan out kits 112 may be used, as known to those skilled in the art. The output fiber optic distribution cable 130 exits the plant environment (hub 10) and is then routed via the access network to the subscriber at an optical network terminal (ONT), for example. A cable attachment plate 124 of conventional form is used to hold the buffer tube 130 in place.

Figure 3:
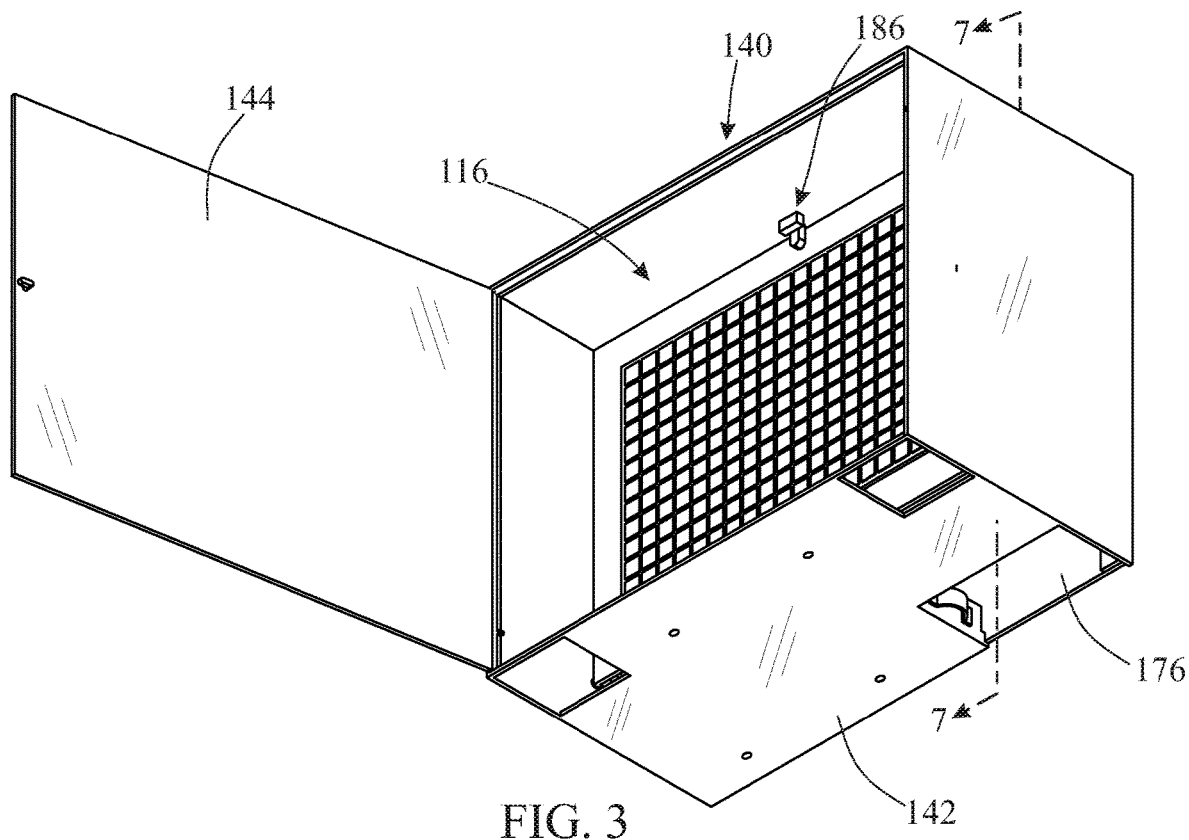
FIG. 3 presents a lower elevation, front isometric view of the distribution housing for the fiber optic distribution hub originally introduced in FIG. 1, illustrating the front plane of the distribution bulkhead accessed by opening the front service panel and further depicting the hinge mechanism to enable the distribution bulkhead to be pivoted forward for servicing.

Reference is now made to FIGS. 3-6, with continuing reference to FIGS. 2 and 7, to describe the physical layout of the box-type enclosure, case or compartment that houses the components 100 of distribution housing 12. As shown, the enclosure of distribution housing 12 includes a top side 140, a bottom side 142, a front side 144 in the form of a swivel door or panel (in an open position in FIGS. 3, 5-6), a rear side 146 in the form of a removable panel or plate (FIG. 4), and a pair of lateral sides 143 (only one shown). The enclosure includes an opening 176 formed at one of the rear corners at the bottom side 142 of the enclosure (FIGS. 3-4). This opening 176 in distribution housing 12 is aligned with the pair of rear upper opening 274, rear lower opening 276 formed in each service provider housing 16. This alignment feature facilitates vertical downward routing of the buffer tube 130 through all of the lower intervening service provider housings 16 (through their respective backplanes 248) in the stacked arrangement 14, until buffer tube 130 emerges from the plant environment. The riser 30 is equipped with suitable openings to facilitate the routing of feeder cables 232 and output cable 130 (FIG. 2). The enclosure is equipped with a suitable barrier or partition plate 180 (FIG. 7).

The distribution housing 12 provides a feature allowing the distribution bulkhead to swivel or pivot downwards, as shown in FIG. 5. For this purpose, the distribution bulkhead 110 is mounted to a suitable drop-down fiber panel 182 (FIG. 7). At a lower end of fiber panel 182, the fiber panel 182 is fitted with a pivot hinge, generally illustrated at 184 (FIGS. 2, 7). At an upper end of fiber panel 182, a releasable locking mechanism, generally illustrated at 186 (FIGS. 3, 7), is provided. Locking mechanism 186 enables the user to lock the fiber panel 182 (and distribution bulkhead 110) in place in the upright position, and, also, to selectively release the lock in order to lower the hinged panel 182. By lowering the hinged panel 182, a service technician is able to access, as needed, the backplane 122 of distribution bulkhead 110. This lowered position of hinged panel 182 is shown in phantom in FIG. 7, with the direction of pivoting as noted.

The fiber distribution hub 10 of the present invention offers several advantages. Due to the scalable feature of hub 10, a single hub 10 can serve as a scalable local convergence point, i.e., a point in the network, usually a cabinet or closure, that marks the breakout from the feeder cable (from the CO/HE) to the distribution cables that go through a neighborhood or MDU. The scaling feature means that hub 10 can accommodate additional service provider housings 20 in stack 14, which can be inserted into the access network via appropriate cabling connections with the distribution housing 12. The multiple carriers represented by the stacked arrangement 14 of service provider housings 16 offer the subscriber a greater number of available services from a wider range of carriers (compared to single-carrier conventional hubs), enabling customers to choose the provider of their choice instead of being restricted to a single carrier. The stacked arrangement 14 of multiple service provider housings 16 serves as a centralized point where additional service provider housings can be added to the network. In this way, carriers are able to limit their exposure to the high cost of fiber optic network construction. For example, if a carrier wants to offer service in a new area, conventional approaches requires the carrier to build an entire new hub to service the target area. However, with the present invention, the carrier need only add a service provider housing 20 to the stack arrangement 14 of the existing hub 10 (where other carriers are serving the target area of interest) and integrate the additional service provider housing 20 to distribution housing 12.

The fiber distribution hub 10 of the present invention allows multiple providers to secure access to customers from a centralized point. This is done by incorporating separate carrier-specific feeder bulkheads (i.e., individual service provider housings) at hub 10 in a stacked, layered configuration, and compartmentalizing the feeder fibers (in distinct service provider housings) to give multiple different carriers control over their feeder fibers, while still being able to access potential customers via a common, shared distribution compartment of hub 10. More particularly, the distribution bulkhead of distribution housing 12 is a common, shared resource available for connection to any and all of the service provider housings 16 in the stacked arrangement 14. Physically compartmentalizing the feeder bulkheads at hub 10 allows multiple carriers to access customers via the same (i.e., a common) fiber optic network, since each service provider housing 16 is routed to the same distribution housing 12 in hub 10.

The present invention, in one implementation, is directed to a modular and scalable fiber optic distribution hub 10. The hub includes a plurality of carrier-specific service provider housing modules 16 configured in a stacked, scalable arrangement 14. The hub further includes a single distribution housing 12, which is shared in common as a shared resource by all of the service provider housing modules 16 in the stacked arrangement 14. The scalable feature allows the hub to be expanded to include additional service provider housing modules 20, which is readily done since the individual service provider housings are provided in modular form.

The modular construction of each service provider housing 16 offers a scalable feature to hub 10. In particular, additional carriers can secure a place in hub 10 by installing their own service provider housing module 20 in hub 10 and connecting it to distribution housing 12, which is shared as a common resource with the other service provider housing modules in the stacked arrangement 14. Further carriers can follow suit in a similar manner.

Since many modifications, variations, and changes in detail can be made to describe preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. A scalable multi-carrier fiber distribution hub for connecting fiber optic cables and passive optical splitters in an outside plant segment of a fiber optic network, the scalable multi-carrier fiber distribution hub comprising:
   a fiber optic distribution module having a distribution module housing defining a fiber optic distribution housing interior;
   a plurality of fiber optic distribution components housed within said fiber optic distribution housing interior, the fiber optic distribution components comprising:

a distribution bulkhead panel having a front plane and an opposite rear plane, the distribution bulkhead panel peripherally framed by a supporting fiber dropdown panel, wherein a lower end of the supporting fiber dropdown panel is hingedly attached to opposite lateral sides of the distribution module housing in such manner that the framed distribution bulkhead panel, when in a vertically-oriented stowed position, functions as a barrier separating the distribution module housing interior into a front compartment defining a distribution module input side and a rear compartment defining a distribution module output side, such that the rear plane of the distribution bulkhead panel is exposed and accessible through a front side of the distribution module housing when a front side panel of the distribution module housing is translated to an open position and the framed distribution bulkhead panel is forwardly pivoted about its hinged attachment; and at least one fiber optic fan out kit coupled to the rear plane of the distribution bulkhead panel;

a riser; and a plurality of scalable stacked fiber optic carrier modules interposed between the fiber optic distribution module and the riser, wherein the plurality of stacked fiber optic carrier modules are independently accessible and controllable by a corresponding plurality of independent fiber optic carriers, each one of the fiber optic carrier modules having a carrier module housing defining a carrier module housing interior containing fiber optic carrier module components in fiber optic communication with the fiber optic distribution components.

2. The scalable multi-carrier fiber distribution hub of claim 1, wherein an upper end of the framed distribution bulkhead panel is releasably secured to the top side of the fiber optic distribution module housing.

3. The scalable multi-carrier fiber distribution hub of claim 1, wherein the fiber optic carrier module housing of each of the plurality of fiber optic carrier modules further comprises:

opposite top and bottom sides;

opposite lateral sides spanning the top and bottom sides;

a rear side in the form of an openable panel spanning the opposite top and bottom sides, and spanning the opposite lateral sides;

a front side in the form of an openable panel spanning the opposite top and bottom sides, and spanning the opposite lateral sides; and an interior vertical partition oriented parallel to the front and rear sides of the carrier module housing, and separating the fiber optic carrier module housing interior into a front compartment defining a fiber optic carrier module output side and a rear compartment defining a fiber optic carrier input side.

4. The scalable multi-carrier fiber distribution hub of claim 3, wherein the fiber optic carrier module components further comprise:

a feeder bulkhead supported within a first opening provided through the fiber optic carrier module interior housing vertical partition, such that a front plane of the feeder bulkhead is exposed within the fiber optic carrier module output side, and a rear plane of the feeder bulkhead is exposed within the fiber optic carrier module input side;

a fiber optic fan out kit mounted to an input side of the fiber optic carrier module interior housing vertical partition; and an optical splitter storage module supported within a second opening provided through the fiber optic carrier module interior housing vertical partition, such that optical splitter storage module input and output ends disposed along a front plane of the optical splitter storage module are exposed within the distribution module output side.

5. The scalable multi-carrier fiber distribution hub of claim 4, wherein the fiber optic carrier module further comprises:

a fiber optic input line interconnecting the input end of the optical splitter storage module and the front plane of the feeder bulkhead;

a plurality of buffer tubes each housing a corresponding plurality of optical fiber strands, each of the buffer tubes interconnecting the rear plane of the feeder bulkhead and an outlet end of the fiber optic fan out kit; and a terminal end of a carrier fiber optic feeder cable received into the rear compartment of the fiber optic carrier module housing through an opening in the bottom side thereof and terminating at an input end of the fiber optic fan out kit, the carrier fiber optic feeder cable originating from a remote carrier optical line terminal (OLT) of a passive optical network.

6. The scalable multi-carrier fiber distribution hub of claim 5, further comprising:

a terminated single mode optical fiber interconnecting the output end of the optical splitter storage module of the fiber optic carrier module with the front plane of the distribution bulkhead panel of the distribution module.

7. The scalable multi-carrier fiber distribution hub of claim 6, wherein the terminated single mode optical fiber interconnecting the output end of the optical splitter storage module of the fiber optic carrier module with the front plane of the distribution bulkhead panel of the distribution module extends from the front compartment of the fiber optic carrier module through an opening in the top side of the fiber optic carrier module housing, and into the front compartment of the fiber optic distribution module through an opening in the bottom side of the fiber optic distribution module housing.

8. A scalable multi-carrier fiber distribution hub for connecting fiber optic cables and passive optical splitters in an outside plant segment of a fiber optic network, the scalable multi-carrier fiber distribution hub comprising:

a plurality of scalable stacked fiber optic carrier modules independently accessible and controllable by a corresponding plurality of independent fiber optic carriers, each one of the plurality of fiber optic carrier modules having a carrier module housing defining a carrier module housing interior containing fiber optic carrier module components, each one of the fiber optic carrier module housings including aligned upper and lower openings provided through respective upper and lower carrier module housing sides, wherein said fiber optic distribution module housing includes a lower opening provided through a corresponding fiber optic distribution module housing lower side, the distribution module housing lower opening aligned with the corresponding upper and lower housing openings of each of the plurality of underlying stacked fiber optic carrier modules; and a fiber optic distribution module disposed upon an uppermost one of the plurality of fiber optic carrier modules, the fiber optic distribution module having a distribution module housing defining a distribution housing interior containing fiber optic distribution components, the fiber optic distribution components optically connected to the fiber optic carrier module components of each of the plurality of scalable stacked fiber optic carrier modules.

9. The scalable multi-carrier fiber distribution hub of claim 8, wherein the fiber optic distribution components further comprise:
  a distribution bulkhead panel having a front plane and an opposite rear plane, the distribution bulkhead panel peripherally framed by a supporting fiber dropdown panel, wherein a lower end of the supporting fiber dropdown panel is hingedly attached to opposite lateral sides of the distribution module housing in such manner that the framed distribution bulkhead panel, when in a vertically-oriented stowed position, functions as a barrier separating the distribution module housing interior into a front compartment defining a distribution module input side and a rear compartment defining a distribution module output side, such that the rear plane of the distribution bulkhead panel is exposed and accessible through a front side of the distribution module housing when a front side panel of the distribution module housing is translated to an open position and the framed distribution bulkhead panel is forwardly pivoted about its hinged attachment; and
  at least one fiber optic fan out kit coupled to the rear plane of the distribution bulkhead panel.

10. The scalable multi-carrier fiber distribution hub of claim 9, wherein an upper end of the framed distribution bulkhead panel is releasably secured to the top side of the fiber optic distribution module housing.

11. The scalable multi-carrier fiber distribution hub of claim 9, wherein the fiber optic carrier module housing of each of the plurality of fiber optic carrier modules further comprises:
  opposite top and bottom sides;
  opposite lateral sides spanning the top and bottom sides;
  a rear side in the form of an openable panel spanning the opposite top and bottom sides, and spanning the opposite lateral sides;
  a front side in the form of an openable panel spanning the opposite top and bottom sides, and spanning the opposite lateral sides; and
  an interior vertical partition oriented parallel to the front and rear sides of the carrier module housing, and separating the fiber optic carrier module housing interior into a front compartment defining a fiber optic carrier module output side and a rear compartment defining a fiber optic carrier input side.

12. The scalable multi-carrier fiber distribution hub of claim 11, wherein the fiber optic carrier module components further comprise:
  a feeder bulkhead supported within a first opening provided through the fiber optic carrier module interior housing vertical partition, such that a front plane of the feeder bulkhead is exposed within the fiber optic carrier module output side, and a rear plane of the feeder bulkhead is exposed within the fiber optic carrier module input side;
  a fiber optic fan out kit mounted to an input side of the fiber optic carrier module interior housing vertical partition; and
  an optical splitter storage module supported within a second opening provided through the fiber optic carrier module interior housing vertical partition, such that optical splitter storage module input and output ends disposed along a front plane of the optical splitter storage module are exposed within the distribution module output side.

13. The scalable multi-carrier fiber distribution hub of claim 12, wherein each of the fiber optic carrier modules further comprises:
  a fiber optic input line interconnecting the input end of the optical splitter storage module and the front plane of the feeder bulkhead;
  a plurality of buffer tubes each housing a corresponding plurality of optical fiber strands, each of the buffer tubes interconnecting the rear plane of the fiber optic carrier module feeder bulkhead and an outlet end of the fiber optic carrier module fan out kit; and
  a terminal end of a carrier-specific fiber optic feeder cable received into the rear compartment of the respective fiber optic carrier module housing through an opening in the bottom side thereof and terminating at an input end of the respective fiber optic carrier module fiber optic fan out kit, the fiber optic feeder cable emanating from a remote carrier-specific optical line terminal (OLT) of a passive optical network.

14. The scalable multi-carrier fiber distribution hub of claim 13, further comprising:
  a plurality of terminated single mode optical fibers interconnecting the output ends of the optical splitter storage modules of the respective plurality of fiber optic carrier modules with the front plane of the distribution bulkhead panel of the distribution module.

* * * * *